(12) United States Patent
Ko

(10) Patent No.: US 11,505,116 B2
(45) Date of Patent: Nov. 22, 2022

(54) VEHICLE COURTESY SIGNALING DEVICE

(71) Applicant: Jae-Hyon Ko, Manassas, VA (US)

(72) Inventor: Jae-Hyon Ko, Manassas, VA (US)

( * ) Notice: Subject to any disclaimer, the term of this patent is extended or adjusted under 35 U.S.C. 154(b) by 107 days.

(21) Appl. No.: 17/065,952

(22) Filed: Oct. 8, 2020

(65) Prior Publication Data

US 2022/0111790 A1    Apr. 14, 2022

(51) Int. Cl.
*B60Q 1/50* (2006.01)
*B60Q 1/00* (2006.01)
*B60Q 1/26* (2006.01)

(52) U.S. Cl.
CPC ............. *B60Q 1/50* (2013.01); *B60Q 1/0076* (2013.01); *B60Q 1/0088* (2013.01); *B60Q 1/2615* (2013.01)

(58) Field of Classification Search
CPC .. B60Q 1/0076; B60Q 1/0088; B60Q 1/2815; B60Q 1/50
See application file for complete search history.

(56) References Cited

U.S. PATENT DOCUMENTS

| | | | |
|---|---|---|---|
| 4,352,461 A | 10/1982 | Orta | |
| 4,975,809 A * | 12/1990 | Ku | B42D 15/022 362/253 |
| 6,282,823 B1 | 9/2001 | Brown | |
| 7,020,992 B1 | 4/2006 | Christie | |
| D587,314 S | 2/2009 | Carnation | |
| 8,161,900 B2 | 4/2012 | Munson | |
| 2014/0002260 A1 | 1/2014 | Wright | |
| 2015/0197185 A1 | 7/2015 | Jones | |

* cited by examiner

*Primary Examiner* — Thomas M Sember

(57) ABSTRACT

A vehicle courtesy signaling device for communicating a wave to a proximate person at night includes a housing, which has a first face that is substantially transparent. A fastener engaged to the housing can selectively engage a rearview mirror or window of a vehicle so that the housing is removably engaged to the rearview mirror or the window, with the first face of the housing being visible through the window. A plurality of light emitting diodes is engaged to the housing and is positioned in an interior space defined thereby. The light emitting diodes selectively emulate a waving hand.

12 Claims, 4 Drawing Sheets

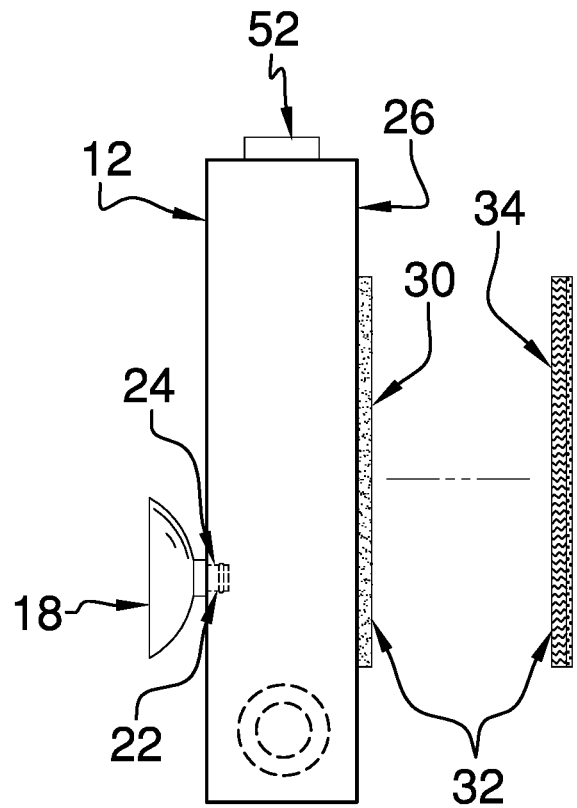
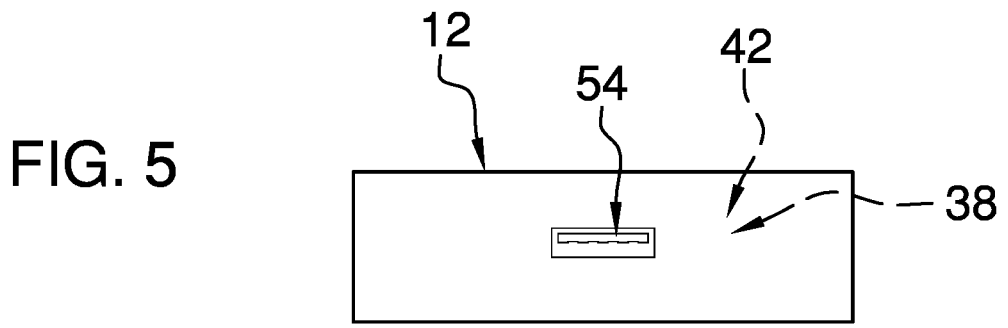
FIG. 4
FIG. 5

VEHICLE COURTESY SIGNALING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to signaling devices and more particularly pertains to a new signaling device for communicating a wave to a proximate person at night.

(2) Description of Related Art Including Information Disclosed Under 37 CFR 1.97 and 1.98

The prior art relates to signaling devices. Prior art signaling devices may comprise flashing signs engageable to a rear windows of vehicles and devices with movable hands.

BRIEF SUMMARY OF THE INVENTION

An embodiment of the disclosure meets the needs presented above by generally comprising a housing, which has a first face that is substantially transparent. A fastener is engaged to the housing and is configured to selectively engage a rearview mirror or window of a vehicle so that the housing is removably engaged to the rearview mirror or the window, with the first face of the housing being visible through the window. A plurality of light emitting diodes is engaged to the housing and is positioned in an interior space defined thereby. The light emitting diodes are configured to selectively emulate a waving hand.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a side view of an embodiment of the disclosure.

FIG. 5 is a bottom view of an embodiment of the disclosure.

DETAILED DESCRIPTION OF THE INVENTION

Figure 1:
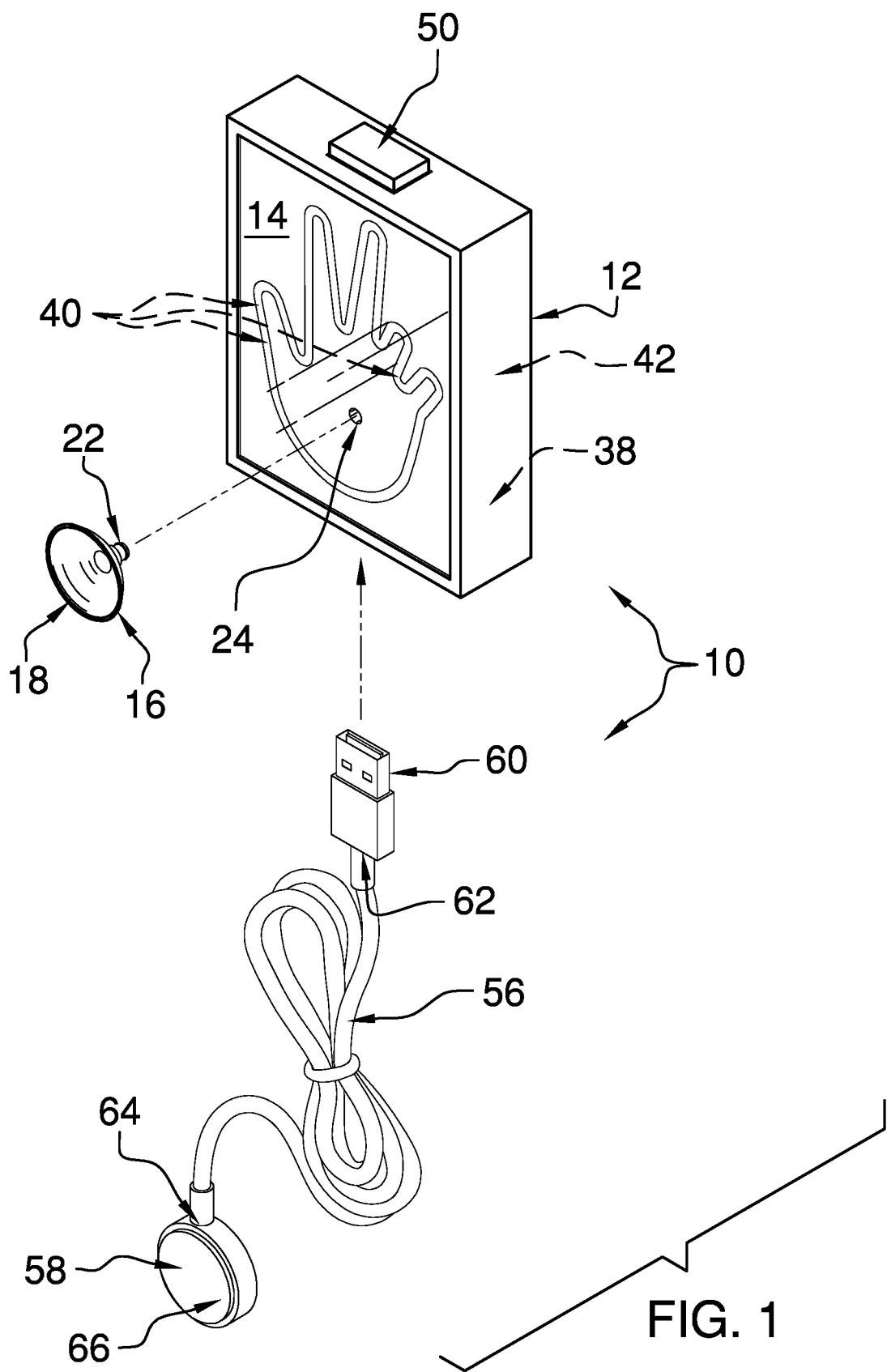
FIG. 1 is an isometric perspective view of a vehicle courtesy signaling device according to an embodiment of the disclosure.
Figure 2:
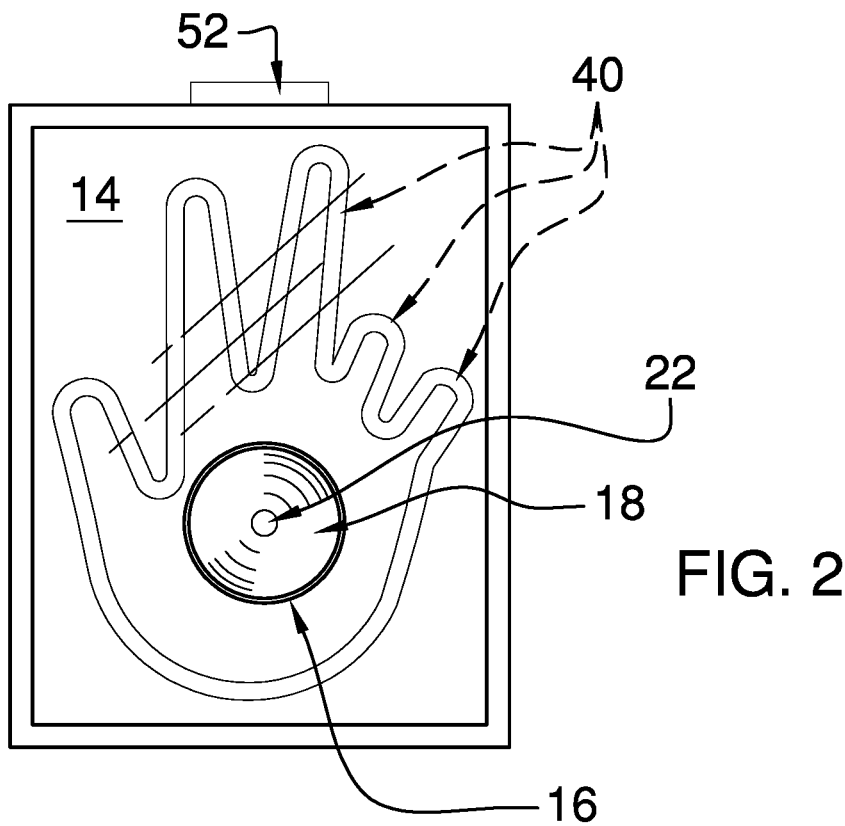
FIG. 2 is a front view of an embodiment of the disclosure.

With reference now to the drawings, and in particular to FIGS. 1 through 6 thereof, a new signaling device embodying the principles and concepts of an embodiment of the disclosure and generally designated by the reference numeral 10 will be described.

As best illustrated in FIGS. 1 through 6, the vehicle courtesy signaling device 10 generally comprises a housing 12, which has a first face 14 that is substantially transparent. A fastener 16 is engaged to the housing 12 and is configured to selectively engage a rearview mirror or window of a vehicle so that the housing 12 is removably engaged to the rearview mirror or the window, with the first face 14 of the housing 12 being visible through the window.

The fastener 16 comprises at least one of a cup 18 and a coupler 20, which should be interpreted to mean only a cup 18, only a coupler 20, or a cup 18 and a coupler 20. The cup 18 has a stem 22 engaged thereto, which is complementary to a recess 24 positioned in the first face 14 of the housing 12. The stem 22 is selectively insertable into the recess 24 to removably engage the cup 18 to the housing 12. The cup 18 is resiliently compressible and thus is configured to be compressed between the housing 12 and the window to removably and suctionally engage the housing 12 to the window. The cup 18 comprises silicone, rubber, or elastomer.

Figure 3:
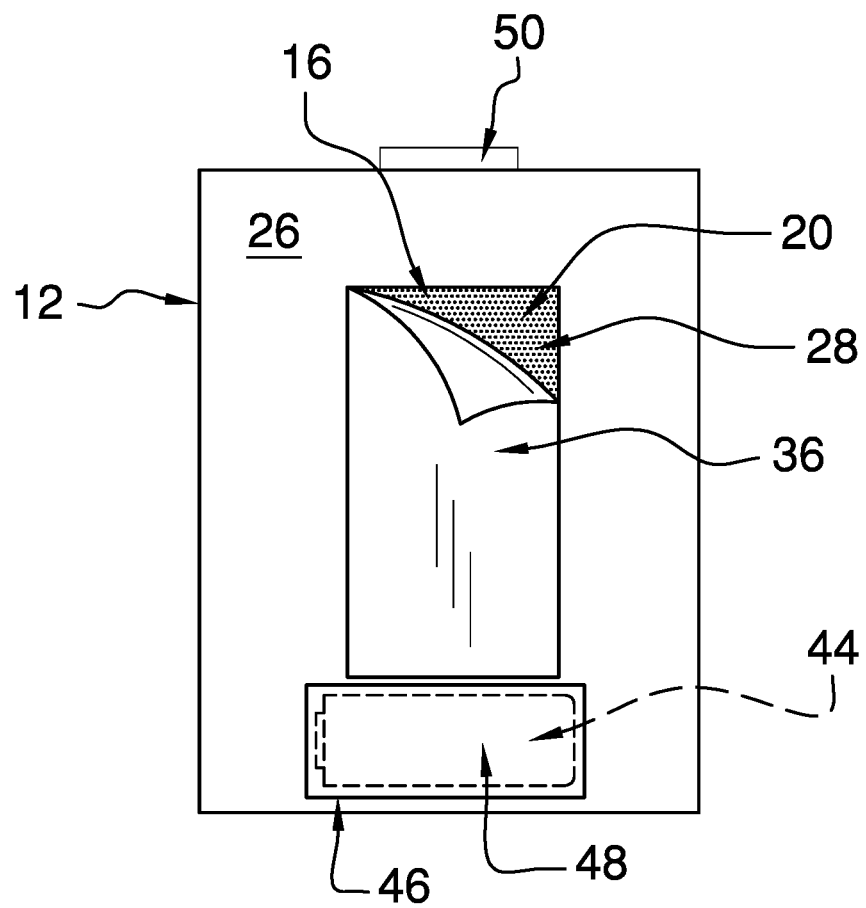
FIG. 3 is a rear view of an embodiment of the disclosure.
Figure 6:
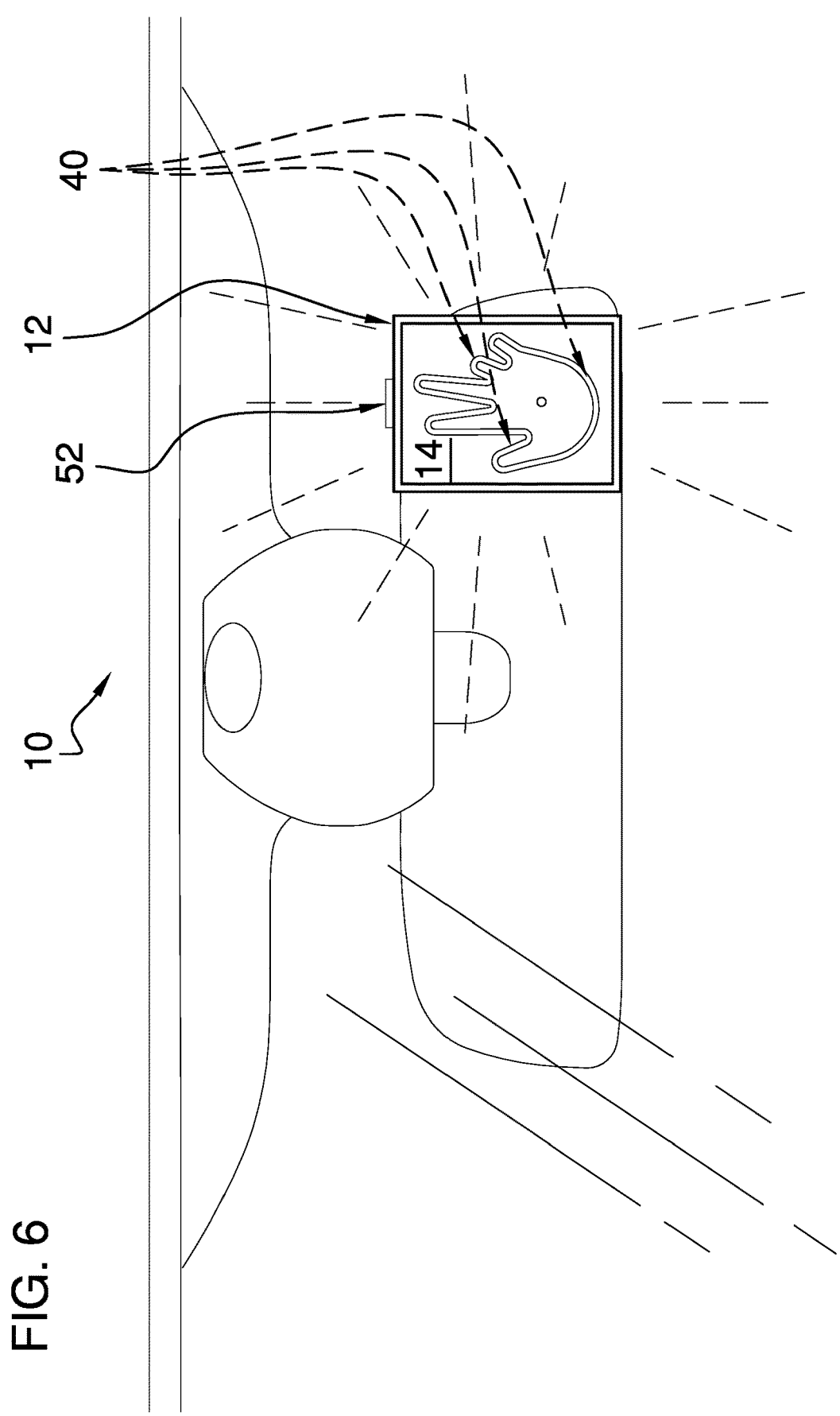
FIG. 6 is an in-use view of an embodiment of the disclosure.

The coupler 20 is engaged to a second face 26 of the housing 12 and is configured to selectively engage the rearview mirror to removably engage the housing 12 to the rearview mirror. The coupler 20 comprises an adhesive strip 28, as shown in FIG. 3, or a first element 30 of a hook and loop fastener 32, as shown in FIG. 4. The first element 30 is positioned to selectively engage a second element 34 of the hook and loop fastener 32, which is adhesively engaged to the rearview mirror, to removably engage the housing 12 to the rearview mirror.

The adhesive strip 28 is configured to adhesively engage the rearview mirror to removably engage the housing 12 to the rearview mirror. A cover strip 36 is removably engaged to the adhesive strip 28, as shown in FIG. 3. The cover strip 36 is configured to be separated from the adhesive strip 28 so that the adhesive strip 28 is configured to adhesively engage the rearview mirror.

A power module 38 and a plurality of light emitting diodes 40 are engaged to the housing 12 and are positioned in an interior space 42 defined thereby. The power module 38 is selectively operationally engageable to the plurality of light emitting diodes 40 to provide power thereto. The light emitting diodes 40 are configured to selectively emulate a waving hand. The power module 38 may comprises a battery 44 or an electrical circuit of the vehicle.

A cutout 46 is positioned in the housing 12 proximate to the battery 44, as shown in FIG. 3, and is configured to allow access to the interior space 42 to service the battery 44. A panel 48 is selectively engageable to the housing 12 to close the cutout 46.

A primary switch 50 is engaged to the housing 12 and is operationally engaged to the plurality of light emitting diodes 40 and the power module 38. The primary switch 50 is configured to be selectively switched to engage the power module 38 to the plurality of light emitting diodes 40. The primary switch 50 comprise a primary button 52, which is depressible, or other switching means, such as, but not limited to, toggles, slides, voice actuators, and the like. The primary button 52 is configured to be depressed a first time to engage the power module 38 to the plurality of light emitting diodes 40 and to be depressed a second time to disengage the power module 38 from the plurality of light emitting diodes 40.

The device 10 also may comprise a port 54, a cord 56, and a remote switch 58, as shown in FIG. 1. The port 54 is engaged to the housing 12 and is operationally engaged to the power module 38 and the plurality of light emitting diodes 40. The cord 56 has a plug 60 is engaged to a first end 62 thereof and the remote switch 58 engaged to a second end 64 thereof. The plug 60 is complementary to the port 54 and thus is positioned for selective insertion into the port 54 to operationally engage the remote switch 58 to the power module 38 and the plurality of light emitting diodes 40. The primary switch 50 is configured to be selectively switched to engage the power module 38 to the plurality of light emitting diodes 40.

The remote switch 58 comprises a remote button 66, which is depressible, or other switching means, such as, but not limited to, toggles, slides, voice actuators, and the like. The remote button 66 is configured to be depressed a first time to engage the power module 38 to the plurality of light emitting diodes 40 and to be depressed a second time to disengage the power module 38 from the plurality of light emitting diodes 40.

In use, the housing 12 is affixed to either the rearview mirror or the windshield using the fastener 16 so that the first face 14 is visible through the windshield. When a user wished to send a wave in low ambient light conditions to a person proximate to the vehicle, they simply depress the first button or the remote button 66 a first time to actuate the plurality of light emitting diodes 40. The first button or the remote button 66 is depressed a second time to terminate the wave.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A vehicle courtesy signaling device comprising:
    a housing, the housing having a first face, the first face being substantially transparent;
    a fastener engaged to the housing and being configured for selectively engaging a rearview mirror or window of a vehicle, such that the housing is removably engaged to the rearview mirror or the window with the first face of the housing being visible through the window; and
    a plurality of light emitting diodes engaged to the housing and positioned in an interior space defined thereby, the light emitting diodes being configured for selectively emulating a waving hand; and
    wherein the fastener comprises:
        a cup having a stem engaged thereto, the stem being complementary to a recess positioned in the first face of the housing, such that the stem is selectively insertable into the recess for removably engaging the cup to the housing, the cup being resiliently compressible, wherein the cup is configured for compressing between the housing and the window for removably suctionally engaging the housing to the window; and
        a coupler engaged to a second face of the housing and being configured for selectively engaging the rearview mirror for removably engaging the housing to the rearview mirror.

2. The vehicle courtesy signaling device of claim 1, wherein the cup comprises silicone, rubber, or elastomer.

3. The vehicle courtesy signaling device of claim 1, wherein the coupler comprises an adhesive strip or a first element of a hook and loop fastener, wherein the adhesive strip is configured for adhesively engaging the rearview mirror for removably engaging the housing to the rearview mirror, such that the first element of the hook and loop fastener is positioned for selectively engaging a second element of the hook and loop fastener adhesively engaged to the rearview mirror for removably engaging the housing to the rearview mirror.

4. The vehicle courtesy signaling device of claim 3, further including a cover strip removably engaged to the adhesive strip, wherein the cover strip is configured for separation from the adhesive strip, wherein the adhesive strip is configured for adhesively engaging the rearview mirror.

5. The vehicle courtesy signaling device of claim 1, further including a power module engaged to the housing and positioned in the interior space, the power module being selectively operationally engageable to the plurality of light emitting diodes for providing power thereto.

6. The vehicle courtesy signaling device of claim 5, wherein the power module comprises a battery.

7. The vehicle courtesy signaling device of claim 6, further including:
- a cutout positioned in the housing proximate to the battery, wherein the cutout is configured for allowing access to the interior space for servicing the battery; and
- a panel selectively engageable to the housing for closing the cutout.

8. The vehicle courtesy signaling device of claim 5, further including a primary switch engaged to the housing and being operationally engaged to the plurality of light emitting diodes and the power module, wherein the primary switch is configured for being selectively switched for engaging the power module to the plurality of light emitting diodes.

9. The vehicle courtesy signaling device of claim 8, wherein the primary switch comprising a primary button, the primary button being depressible, wherein the primary button is configured for being depressed a first time for engaging the power module to the plurality of light emitting diodes and for being depressed a second time for disengaging the power module from the plurality of light emitting diodes.

10. A vehicle courtesy signaling device comprising:
- a housing, the housing having a first face, the first face being substantially transparent;
- a fastener engaged to the housing and being configured for selectively engaging a rearview mirror or window of a vehicle, such that the housing is removably engaged to the rearview mirror or the window with the first face of the housing being visible through the window;
- a plurality of light emitting diodes engaged to the housing and positioned in an interior space defined thereby, the light emitting diodes being configured for selectively emulating a waving hand;
- a power module engaged to the housing and positioned in the interior space, the power module being selectively operationally engageable to the plurality of light emitting diodes for providing power thereto:
- a port engaged to the housing and being operationally engaged to the power module and the plurality of light emitting diodes; and
- a cord having a plug engaged to a first end thereof and a remote switch engaged to a second end thereof, the plug being complementary to the port, such that the plug is positioned for selective insertion into the port for operationally engaging the remote switch to the power module and the plurality of light emitting diodes, wherein the primary switch is configured for being selectively switched for engaging the power module to the plurality of light emitting diodes.

11. The vehicle courtesy signaling device of claim 10, wherein the remote switch comprises a remote button, the remote button being depressible, wherein the remote button is configured for being depressed a first time for engaging the power module to the plurality of light emitting diodes and for being depressed a second time for disengaging the power module from the plurality of light emitting diodes.

12. A vehicle courtesy signaling device comprising:
- a housing, the housing having a first face, the first face being substantially transparent;
- a fastener engaged to the housing and being configured for selectively engaging a rearview mirror or window of a vehicle, such that the housing is removably engaged to the rearview mirror or the window with the first face of the housing being visible through the window, the fastener comprising at least one of:
  - a cup having a stem engaged thereto, the stem being complementary to a recess positioned in the first face of the housing, such that the stem is selectively insertable into the recess for removably engaging the cup to the housing, the cup being resiliently compressible, wherein the cup is configured for compressing between the housing and the window for removably suctionally engaging the housing to the window, the cup comprising silicone, rubber, or elastomer, and
  - a coupler engaged to a second face of the housing and being configured for selectively engaging the rearview mirror for removably engaging the housing to the rearview mirror, the coupler comprising an adhesive strip or a first element of a hook and loop fastener, wherein the adhesive strip is configured for adhesively engaging the rearview mirror for removably engaging the housing to the rearview mirror, such that the first element of the hook and loop fastener is positioned for selectively engaging a second element of the hook and loop fastener adhesively engaged to the rearview mirror for removably engaging the housing to the rearview mirror;
- a cover strip removably engaged to the adhesive strip, wherein the cover strip is configured for separation from the adhesive strip, wherein the adhesive strip is configured for adhesively engaging the rearview mirror;
- a plurality of light emitting diodes engaged to the housing and positioned in an interior space defined thereby, the light emitting diodes being configured for selectively emulating a waving hand;
- a power module engaged to the housing and positioned in the interior space, the power module being selectively operationally engageable to the plurality of light emitting diodes for providing power thereto, the power module comprising a battery;
- a cutout positioned in the housing proximate to the battery, wherein the cutout is configured for allowing access to the interior space for servicing the battery;
- a panel selectively engageable to the housing for closing the cutout;
- a primary switch engaged to the housing and being operationally engaged to the plurality of light emitting diodes and the power module, wherein the primary switch is configured for being selectively switched for engaging the power module to the plurality of light emitting diodes, the primary switch comprising a primary button, the primary button being depressible, wherein the primary button is configured for being depressed a first time for engaging the power module to the plurality of light emitting diodes and for being depressed a second time for disengaging the power module from the plurality of light emitting diodes;
- a port engaged to the housing and being operationally engaged to the power module and the plurality of light emitting diodes; and
- a cord having a plug engaged to a first end thereof and a remote switch engaged to a second end thereof, the plug being complementary to the port, such that the plug is positioned for selective insertion into the port for operationally engaging the remote switch to the power module and the plurality of light emitting diodes, wherein the primary switch is configured for being selectively switched for engaging the power module to the plurality of light emitting diodes, the remote switch comprising a remote button, the remote button being depressible, wherein the remote button is configured for being depressed a first time for engaging the power module to the plurality of light emitting diodes and for being depressed a second time for disengaging the power module from the plurality of light emitting diodes.

\* \* \* \* \*